United States Patent Office 3,288,828
Patented Nov. 29, 1966

3,288,828
PREPARATION OF ORGANOMETALLIC
COMPOUNDS
Thomas Wartik and Robert L. Barnes, State College, Pa.,
assignors to Koppers Company, Inc., a corporation of
Delaware
Filed Feb. 26, 1963, Ser. No. 260,974
7 Claims. (Cl. 260—429)

This invention relates to a new method for the preparation of organometallic compounds. In one specific aspect, it relates to a new method for the preparation of methylaluminum halides by reacting aluminum carbide with a hydrogen halide. In another specific aspect, it relates to a method for the methylation of Group IVA metal halides.

Organometallic compounds which may be prepared according to the present invention have numerous industrial uses. For example, trimethyl aluminum is well-known as a fuel additive; methylaluminum halides may be used as intermediates in making trimethyl aluminum or to prepare other organometallic compounds such as trimethylborane. A very important use of organo aluminum compounds is in the formation, from aluminum alkyls and some transition metal compounds, of catalysts which are useful for olefin polymerization. The methylsilicon halides, such as methyltrichlorosilane and dimethyldichlorosilane, are used in the ever-expanding silicone industries. Another use of methyl trichlorosilane is in the reaction with sodium hydroxide and water to prepare a commercial waterproofing composition, sodium methylsiliconate. The methylead halides may be used as an intermediate in the preparation of tetramethyllead and trimethylborane, which are effective fuel additives.

Heretofore, the methylaluminum compounds have been prepared by two general methods. The first method involves a metathetic reaction with another organometallic compound. When the metal is more electropositive than aluminum, e.g., lithium and sodium, the reaction is illustrated by the equation:

$$3CH_3Li + AlCl_3 \rightarrow (CH_3)_3Al + 3LiCl$$

This method is uneconomical because it requires another organometallic compound, e.g., methyllithium, which is very expensive. For metals less electropositive than aluminum, e.g., lead and mercury, the reaction is illustrated by the equation:

$$3(CH_3)_4Pb + 4Al \rightarrow 4(CH_3)_3Al + 3Pb$$

Unfortunately, this method is inefficient and only low yields of product have been obtained.

The second method is used commercially and involves the preparation of the aluminumsesquichloride. This preparation is illustrated by the equations:

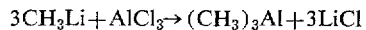

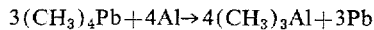

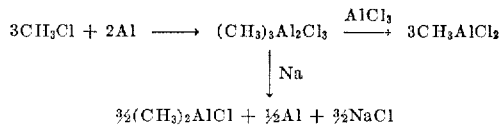

Quite surprisingly, we have discovered a new method for the preparation of trimethyl aluminum and methylaluminum halides of the formula $(CH_3)_nAlX_{3-n}$, wherein $n$ is an integer having a value of from 1 to 3. This method involves reacting, under anhydrous, oxygen-free, conditions, aluminum carbide with a hydrogen halide at a temperature of 150–450° C., while removing the methylaluminum compound as rapidly as it is formed.

As one aspect of our novel reaction, we have also discovered a new method of making organometallic compounds of the formula $(CH_3)_nMX_{4-n}$ wherein M is an element of Group IVA having an atomic number of 14–82 inclusive, X is a halogen having an atomic number of 9–35 inclusive, and $n$ is an integer having a value of 1 to 4, comprising reacting in an anhydrous, oxygen-free atmosphere, a metallic halide of the formula $MX_m$, wherein M and X are defined as aforesaid, and $m$ is the valence of M, with aluminum carbide in the presence of a hydrogen halide or acetic acid at a temperature of 70–450° C.

It is therefore an object of the present invention to provide a new and inexpensive method for the preparation of trimethylaluminum and methylaluminum halides.

Another object of our invention is to provide a new method of methylating Group IVA metal halides.

Other objects and advantages of the invention will become apparent from the following description taken in conjunction with the accompanying drawings in which.

Figure 1:
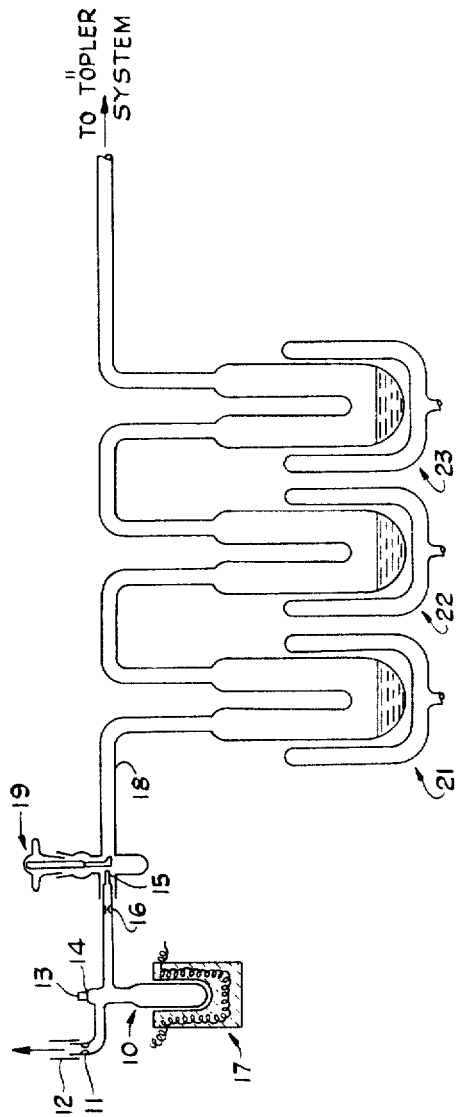
FIGURE 1 is a schematic diagram of a static system for the production of the organometallic compounds described herein.

Our reaction can be run in either a static or a dynamic system; that is, in either a sealed autoclave or a flow reactor under variable temperatures and pressure. The static reaction may be carried out in a small sealed glass ampoule with materials being handled by vacuum line techniques as shown in FIGURE 1. This set up, run in completely inert and controlled atmospheres, permits one to obtain maximum information about the course of the reaction, using only minimum quantities of reactants. Although it is ideally suited for preliminary studies and for investigations of reaction mechanisms, it is not suitable for studying higher reaction pressures. For these purposes, as well as for manufacture on a limited scale, autoclaves are more useful static reactors.

In the static system of FIGURE 1, the reaction is carried on in a small (e.g. 15 cm. in length and 30 mm. in diameter) Pyrex ampoule 10, equipped with a constricted side arm 11 for sealing to a vacuum line 12, an extension 13, with a scratch mark 14 to facilitate addition of the $Al_4C_3$ and a key-breaker type arm 15 which can be broken at point 16. The ampoule 10 is connected to a greaseless section of the vacuum line 12, evacuated and flamed. The ampoule is then filled to one atmosphere pressure with dry nitrogen gas and broken at the scratch mark 14 with a glass rod. Aluminum carbide weighed in a special tube (not shown) is transferred into the ampoule 10 under a stream of dry nitrogen gas. The extension 13 is sealed and the ampoule is evacuated and chilled to −196° C. Required amounts of Group IVA metal halide and hydrogen halide are distilled or otherwise introduced into the ampoule by surrounding the latter with a −196° C. bath. However, when only the methylaluminum compounds are desired, the Group IVA metal halide are omitted. The ampoule is then sealed at the side arm 11 from the vacuum line 12, and the lower half placed in an electrical heater 17 for about three hours at the desired temperatures. The ampoule is then removed, attached to the vacuum line 18 through the key-breaker 19 and frozen to −196° C. for not less than one hour. The ampoule is opened and noncondensibles pumped through a series of traps 21, 22, 23 and measured in a Töpler system (described in Sanderson "Vacuum Manipulation of Volatile Compounds"). Condensible volatile products are distilled from the ampoule 10 into the traps 21, 22, 23, for further analysis. Several milliliters of degassed water are then distilled into the ampoule which is sealed at 16 and warmed to room temperature to react unused $Al_4C_3$. The ampoule is opened to the vacuum line through a key-breaker arm (not shown) and methane is measured. The solution remaining in the ampoule is analyzed for halide and the solid is analyzed for Group IVA metals.

For large-scale manufacture or for investigation of pre-equilibria product distribution, flow systems are superior. The flow reactors are exceedingly versatile since they can be operated at subatmospheric to superatmospheric pressures. The solid reactant, the carbide, may be spread over the bottom of a horizontal reactor tube, on horizontal mesh trays in a vertical tube, or may even be suspended as a fluidized bed in a vertical reactor.

Figure 2:
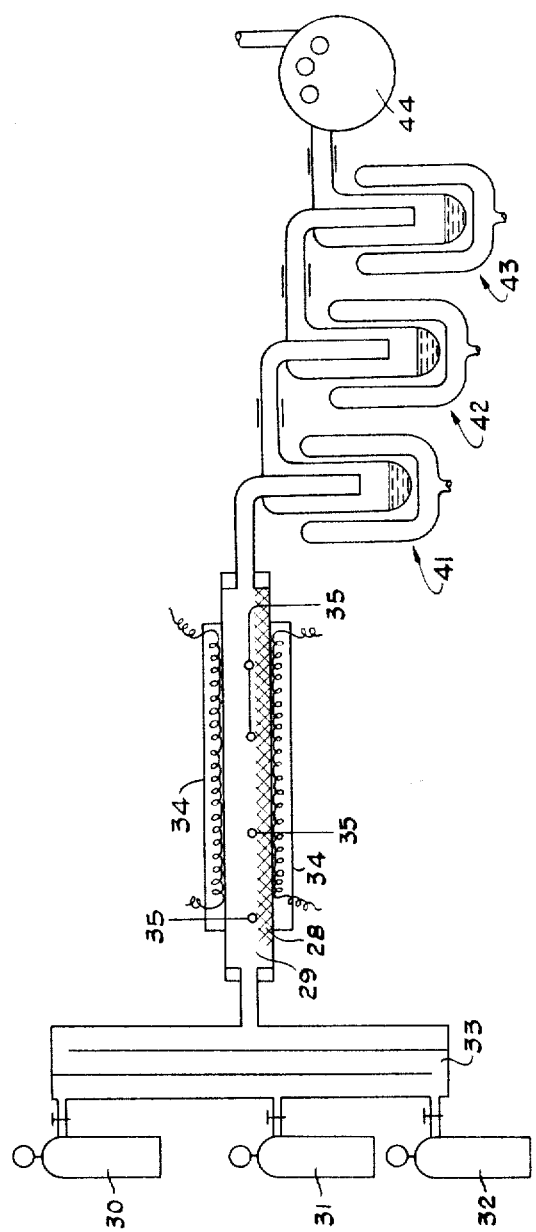
FIGURE 2 is a schematic diagram of a flow system for the continuous production of the organometallic compounds described herein.

A representation of a simple laboratory flow reactor is given in FIGURE 2. In a typical run using this apparatus, weighed carbide 28, with or without an inert diluent such as washed glass beads or vermiculite (not shown), is spread over the bottom of the tube 29, then dried by being heated in a stream of either hydrogen or the "inert atmosphere" (e.g. helium) from cylinder 31. Depending on the quality and source of the carbide, activation may or may not be necessary. If it is required, the carbide may be activated by heating for approximately one-half hour at 400–500° C. until product gases and all tars have been removed. Under these anhydrous oxygen-free conditions, predetermined and controlled flows of hydrogen halide from cylinder 30 and, if desired, volatilized Group IVA metal halide from cylinder 32 are mixed in known proportions in mixing chamber 33, then passed over the carbide bed 28 in the reactor tube 29 which is heated by heater 34. Frequent readings of the thermocouples 35 are advisable, in order to follow the course of the reaction. Obviously, the solid Group IVA metal halides are more advantageously mixed with the carbide in the bed than volatilized.

With this system, it is advisable to use a series of condensate traps at successively colder temperatures, e.g. ice-cooled (0–5°) trap 41, Dry Ice-solvent cooled (−80° C.) trap 42 and liquid nitrogen cooled (−196° C.) trap 43. Gases not liquefied at −196° C. can be measured by being passed through a wet test meter 44 or similar device.

Reactants used in the present invention must be anhydrous and oxygen-free. Any of the hydrogen halides (other than HI) can be used as dry, oxygen-free liquids or gases, but they are not equally desirable. The most convenient and cheapest hydrogen halide is hydrogen chloride. Hydrogen fluoride cannot be used with glass apparatus or in the presence of silica, but is satisfactory otherwise. Acetic acid has been shown, under proper conditions, to be equivalent.

Aluminum carbide must be anhydrous. If the aluminum carbide is prepared from aluminum oxide by reduction with pitch tar, a high degree of purity is required to eliminate residues that would interfere with the novel reaction.

The metal halides useful in the reaction must be anhydrous and may be represented by the general formula $MX_m$, wherein M is an element of Group IVA of the Periodic Table and having an atomic number between 14–82, X is a halogen having an atomic number between 9–35, and $m$ is an integer equal to the valence of M. The halide group need not be the same as the X or HX. Suitable metal halides include silicon halides, e.g. silicon tetrabromide, silicon tetrachloride, and silicon tetrafluoride, germanium halides, e.g. germanium dibromide, germanium tetrabromide, germanium difluoride, and germanium tetrafluoride; tin halides, e.g. stannous bromide, stannic bromide, stannic bromide trichoride, stannic dibromide dichloride, stannic tribromide chloride, stannous fluoride, and stannic fluoride; lead halides, e.g. lead bromide, lead chloride, lead tetrachloride, and lead fluoride.

It is essential that, during the course of the reaction, an anhydrous oxygen-free atmosphere be maintained. The hydrogen halide, participating in the reaction, may also be used to produce the anhydrous oxygen-free atmosphere. However, it is usually preferable to activate the aluminum carbide by heating in a stream of anhydrous oxygen-free inert gas, such as nitrogen, helium, etc. Hydrogen may be used. If the reaction is operated under high pressure, e.g. 500–10,000 p.s.i., or at a high flow rate with low reactant vapor concentrations, an inert atmosphere should be used.

The temperature required for the preparation of methylaluminum halides is within a range of 150–450° C. with the preferred range of 250–350° C. Temperatures below 150° C. were found to be ineffective. In the preparation of the Group IVA metal compounds, a temperature within the range of 70–450° C. was required, with a range of 100–300° C. preferred in reactions in which solvents are used and a range of 200–350° C. preferred in dry bed flow reactions.

Generally, atmospheric pressure is preferred for making organometallic compounds by our novel reaction. However, sometimes it is useful or helpful to use reduced pressure, such as in making methylaluminum halides, where it is necessary that these products be removed from the hydrogen halide and the aluminum trihalide as rapidly as possible by vacuum distillation. In preparing the Group IVA metal compounds, pressures from subatmospheric to superatmospheric of up to about 1000 p.s.i.g. are useful.

The stoichiometric ratio of the reaction between the aluminum carbide and hydrogen halide is 1:9 molar regardless of whether the reaction gives trimethyl aluminum, dimethyl aluminum halide or methyl aluminum dihalide. However, to minimize the formation of methane during the reaction an excess over the stoichiometric amount of aluminum carbide should be used, so that for preparing $(CH_3)_n AlX_{3-n}$ the molar ration of aluminum carbide to hydrogen halide should be about 1:0.3–6; if an inert gas is used in this reaction, the molar ratio approaches the stoichiometric amount so that, for example, by passing the gaseous mixture over or through aluminum carbide, it is possible to have utilized finally, a ratio of aluminum carbide to hydrogen halide of about 1:8, while never having more than 1:6 present. For making Group IVA metal compounds the mole ratio is less critical so that for the ration between $Al_4C_3:MX_m:HX$ is in the range of 1:0.1–5:0.3–9. The aluminum carbide to metal halide ratio largely determines the extent of methylation. It is possible by recycling the methylated compound to increase the extent of methylation.

When using a static system to prepare the Group IVA metal compounds, solvents such as nitrobenzene and tetramethylenesulfone, or preferably a heel or distillation cut of the previous reaction may be required.

For making the methyllead and methyltin compounds like the methylaluminum halide, it is necessary that the product be removed from the reactor as fast as possible. On the other hand, this is not as important in the preparation of the methyl silicon compounds.

Our invention is further illustrated by the following examples.

EXAMPLE I

Using equipment similar to that described in FIGURE 2, a portion of the vacuum line designed for this work consisted of a bulb reservoir for measuring gaseous HCl, a manometer for following flow rate, a stopcock for control of flow, a furnace tube, and a collection system. Hydrogen chloride was passed through the furnace tube and products were passed through a U-trap equipped with several hook-breaker type arms (hereinafter designated trap A), a stopcock and a standard type U-trap (hereafter designated trap B) which led to the main portion of the vacuum line and pump. The reservoir system and trap B were connected to the vacuum system by mercury float valves in such a manner as to allow transfer between them without exposing the aluminum carbide section to the transfer. The furnace tube was 45 cm. long and 15 mm. in diameter. One-half of the tube served as a pre-heat section and was snugly packed with glass wool. Two additional furnace tubes were placed around the above section to allow for different temperatures in the preheat and carbide charge zones. However, during the experiments described below, both sections were held at the same temperature. Before the $Al_4C_3$ was placed in the tube, the entire apparatus was connected to the vacuum line, evacuated and thoroughly dried. Dry nitrogen gas was admitted and the furnace section was cracked at two scratches by means of a hot glass rod. A known quantity of $Al_4C_3$ was loaded into the tube in the dry box and was snugly packed between two plugs of glass wool to prevent movement. The section was resealed onto the vacuum line under nitrogen pressure, evacuated, heated to 400° C. and held at that temperature until evolution of gases had ceased.

The following experiments were conducted with both the preheat and carbide charge sections held at 300±10° C. The size of the reservoir bulb, amount of hydrogen chloride and $Al_4C_3$ charge samples, and flow times are described with the results of individual experiments. The flow rate of HCl was manually controlled by means of the stopcock between the reservoir and the charge sections and in all cases was as slow as possible. Volatile products were passed through trap A held at −78° C. and trap B held at −196° C. It was expected that the volatile intermediate aluminum species would be retained at −78° C. and the unreacted HCl at −196° C. Since the system was pumped on continuously during the experiments, no attempt was made to measure the gaseous products non-condensible at −196° C. i.e., hydrogen. The temperatures of the furnace section were measured by thermocouples tied onto the furnace tube by copper wire. After a particular series of reactions had been completed, the carbide charge was cooled and observed. The portion which the hydrogen chloride first contacted had been reduced in amount and was grey in color while the remainder of the carbide retained its characteristic yellow color. White solids (chiefly aluminum chloride and its methylaluminum chloride adducts) were deposited in the cold sections as either end of the furnace zone. Brown solids were observed at the juncture of the hot and cold zones at the pump end of the furnace section.

The first experiments resulted in incomplete conversion of the hydrogen chloride. The reservoir section consisted of a bulb of about two liter capacity. The bulb was filled with 69.51 mmoles of hydrogen chloride which was to be reacted with 37.4 mmoles of aluminum carbide. After the first pass, unreacted hydrogen chloride was recycled back to the reservoir system, measured and again reacted with the aluminum carbide. The above procedure was repeated and a third pass was made. Results are listed below.

|  | Time of Flow, minutes | Percent HCl Reacted (of original) |
| --- | --- | --- |
| 1st pass | 75 | 65 |
| 2d pass | 35 | 86 |
| 3d pass | 15 | 97 |

Trap A was sealed from the vacuum line and warmed to room temperature. Volatile white solids were present which could be sublimed to a portion of the trap which was cooled to −196° C. A considerable amount of other solids were present which had a brownish-white color. In order to separate volatile material, the trap was sealed by means of one of the breaker arms, to a similar trap on the vacuum system and the apparatus was evacuated and dried in the usual manner. Trap A was opened by means of a magnetic breaker and contents were pumped for three hours into the new trap held at −196° C. Both traps were sealed from the vacuum line and the original, which contained non-volatile solids, largely aluminum chloride, was discarded without further study. The melting point of the volatile solids, determined by completely immersing the trap and breaker arms in a water bath, was 72.5–73.7° C. and the entire sample had apparently melted at the upper limit of this temperature range (methylaluminum dichloride melts at 72.7° C., according to Grosse & Mavity, J. Org. Chem., 5, 106 (1940)). About one ml. of water was distilled to the ampoule and the solids were hydrolyzed at room temperature for several hours. Non-condensible gases (0.3255 mmole methane) were removed and the contents of the ampoule were rinsed into a volumetric flask with dilute hydrochloric acid for aluminum and chloride determinations. Analytical results showed the meltable solid to be methylaluminum dichloride.

EXAMPLE II

In order to attempt the complete reaction of a sample of hydrogen chloride during a single pass, the reservoir was changed to a tube of such a size that the total volume of the section was about 100 cc. It was found that a sample of about 2.5 mmoles of hydrogen chloride, whose flow through the furnace section was controlled by the stopcock previously described, was completely reacted when the time per pass was about 30 minutes. After two such treatments on a flask sample of aluminum carbide (57.5 mmoles) no hydrogen chloride was retained in trap B. As a precautionary measure, the trap was held at −196° C. while an additional 39 passes (for a total of 113 mmoles of hydrogen chloride) were completed. The −78° C. trap was sealed from the vacuum line and allowed to stand at room temperature for one week. Non-condensibles (0.0487 mmole methane) were removed and solids volatile at room temperature were isolated in another trap in a manner described previously. Although the volatile material appeared to consist solely of a white solid, a melting point determination showed that some solid remained in the ampoule at 78° C. although the bulk of the solid began to melt at 72° C. On cooling, a large portion of the sample did not solidify and remained liquid at room temperature indicating that disproportionation of the material had probably taken place. Non-condensible gases (0.0487 mmole methane) were removed and about one cc. of $D_2O$ was distilled into the ampoule. After the mixture was allowed to stand at room temperature overnight, non-condensible gases (0.3692 mmole) were removed and their mass spectrum was recorded. The results showed that the gases were namely $CH_3D$ corresponding to products having only one carbon-bound Al atom per molecule. Analytical values corresponded to the composition $Al(CH_3)_{1.21}Cl_{1.85}$ and showed that the products of this aluminum carbide-HCl reaction were methylaluminum dichloride and dimethylaluminum chloride in approximately a 5:1 molar ratio.

When water was added to the residual carbide charge, a violent reaction occurred which involved considerable sparking of the solid and burning of the evolving gases (in contrast to the relatively slow and smooth hydrolysis of the aluminum carbide being used for these experiments. This suggests that the reaction residue contains appreciable quantities of more complex reaction products, such as $CH_n(AlCl_2)_{4-n1}$ where $n=0-2$. This is proven in Example X.

EXAMPLE III

This experiment demonstrates the volatilization of methylaluminum chloride and that this product must be removed as rapidly as it is formed.

Using the apparatus of FIGURE 1, a 200 ml. glass ampoule was charged with 10.7 mmoles of aluminum carbide and 6.416 mmoles of hydrogen chloride. The ampoule was sealed and heated at 150° C. for four hours. The volatile contents were determined and found to consist of 2.01 mmoles of a mixture of hydrogen and methane. Since the aluminum carbide used contained some elemental aluminum as an impurity, the initial treatment with hydrogen chloride released hydrogen gas, in addition to methane. Following this pretreatment, the ampoule was resealed and the solid residue was heated at 150° C. with 8.67 mmoles of hydrogen chloride for an additional four-hour period. Only 94.8% of the hydrogen in the hydrogen chloride consumed was collected as methane. Two subsequent similar treatments yielded corresponding values of 91.6% and 96.9%.

The reaction ampoule at this point contained a residue non-volatile at 150° C. and two additional solids, one of which evaporated in vacuo at room temperature and the other of which did not ($AlCl_3$). The volatile white solids, which evaporated at room temperatures, were formed in small amounts and corresponded in appearance to methylaluminum chloride.

EXAMPLE IV

Using the flow system described in FIGURE 2, the horizontal vycor tube was charged with 30.4 grams of commercial grade aluminum carbide (88.5 percent aluminum carbide) by spreading the charge over half the length of the tube to form a bed having a maximum depth of less than one half the diameter of the tube. The tube was heated to a temperature of 800° C. for one hour while sweeping dry nitrogen over the bed at 10 liters per hour resulting in a weight loss of 0.8 gram. A gaseous mixture of silicon tetrachloride and hydrogen chloride was passed over the bed by sweeping dry nitrogen at a rate of 66 liters per hour through commercial liquid silicon tetrachloride (containing not more than two percent HCl) at a temperature of 300° C. whereby 0.4 gram per minute of silicon tetrachloride was charged to the reactor. The reaction temperature was maintained at 300° C. for 45 minutes but no aluminum chloride appeared to be formed. The temperature of the tube was then raised to 565° C. over a period of 90 minutes and it was observed that aluminum trichloride started to sublime appreciably at about 450° C. After raising the reaction temperature to 650° C. over a period of one hour, the reaction was terminated.

Of a total of 61.4 grams of silicon tetrachloride charged at 150 minutes, there was recovered a total of 99.5 percent as follows:

(a) The ice-water trap contained 35.6 grams,
(b) The dry-water trap contained 17.7 grams,
(c) The caustic scrubber contained 0.22 grams,
(d) The tubing absorbed 0.9 gram, and
(e) the reactor contained 6.7 grams.

Aluminum chloride (4.2 grams) was distilled from the reactor solids. Approximately eleven percent of the charged aluminum carbide had reacted: about half by formation of silicon carbide at the highest temperature and the rest by joint action of silicon tetrachloride and hydrogen chloride at the lower temperatures. The overall yield of methylsilicon chlorides formed was at least 50 percent on the amount of HCl charged or the amount of $SiCl_4$ consumed.

EXAMPLE V

In an autoclave, under constant stirring was suspended 144 grams of aluminum carbide and 187 grams of silicon tetrachloride. The mixture was heated to a temperature of 150° C. and a small increment of anhydrous hydrogen chloride was charged with the pressure being permitted to come to equilibrium. The temperature was then raised to 170° C., an additional small increment of HCl was charged and the pressure again permitted to come to equilibrium. This step was repeated at 180° C. and 200° C. giving a total of 131 grams of dry HCl charged. The molar ratio of reactants charged was 3.6 m. of hydrogen chloride, 1 m. of aluminum carbide and 1.1 m. of silicon tetrachloride. The autoclave was vented, the contents were filtered and distilled. The bulk of $(CH_3)_{1-2}SiCl_{3-2}$ appeared in fraction B.P. 57–62° C. and weighing 44.2 grams.

Repetition of this experiment in which the major change was the addition of 8.77 m. of HCl per m. of aluminum carbride at 200° C. produced less than a one percent yield of 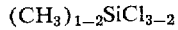$(CH_3)_{1-2}SiCl_{3-2}$, with more than 75 percent of the aluminum carbide converted to methane.

EXAMPLE VI

In a flask purged with argon was added a stirred suspension of 72 grams of ground and dried aluminum carbide (0.5 m.) and 94 grams of silicon tetrachloride in methylcyclohexane (0.55 m.) and treated at a temperature of 25–30° C. with 164 grams of dry hydrogen chloride (4.5 m.). No methyl silanes and no methane were detected in the gas or liquid samples tested. Then 25 grams silicon tetrachloride and 85 grams of solvent were added and the mixture heated at reflux (90.5° C.) for a period of 17.5 hours during which an additional 164 grams of HCl was added. The filtration gave a 98 percent recovery of aluminum carbide, practically no methane was contained in the ventings but the distillation forerun the 50–80° C. contained detectable amounts of $(CH_3)SiCl_3$ and $(CH_3)_2SiCl_2$.

By selection of solvents B.P., i.e., 150° C.–200° C. and setting condenser coolant at 60–70° C., $CH_3SiCl_3$ containing small quantities of $(CH_3)_2SiCl_2$ can be distilled out as rapidly as it is formed at atmospheric pressure. If the reaction temperature is raised to or above 200° C., higher product ratios of methane to methylchlorosilanes are obtained, with almost the entire amount of hydrogen chloride being absorbed.

EXAMPLE VII

Repeating the procedure under Example IV, lead chloride was mixed with aluminum carbide to form a bed and dry hydrogen chloride was passed over the mixture. Traces of $(CH_3)_nPbCl_{4-n}$ were recovered in the ice water trap but a large amount of the product was decomposed along the tube at a temperature of 300° C. to give lead mirrors.

This could be ameliorated by use of an "instantaneous quench," e.g., by having the gases, immediately after having the reactor bed, impinge on a condenser cooled to about −70° C.

EXAMPLE VIII

To show the difference of our method over the prior art (Berichte 46, 3738 (1913)) a stirred suspension of 10 grams aluminum carbide and 10 grams lead chloride in 100 ml. of benzene was treated dropwise with 75 ml. of concentrated hydrochloric acid. A yield of 95% methane was obtained but no methyl-lead compounds were present in water or benzene phase.

The experiment was repeated substituting 10 grams of potassium hydroxide in 65 ml. of water instead of HCl. The results were an 85% yield of methane but no methyl lead compounds were present.

This example shows that in order to form methyl-lead compounds, according to the reaction with aluminum carbide, anhydrous conditions must be maintained.

EXAMPLE IX

A suspension of aluminum carbide in dimethyl sulfoxide was placed in a distillation flask and treated at a temperature of 150° C. dropwise with a solution of lead acetate in acetic acid (using 2 grams lead acetate as about a 5% solution). The acetic acid was distilled off and the distillate was found to contain no methyl-lead compounds. After the addition was complete and the acetic acid was removed, bromine was added at a temperature of 80° C. and methyl bromide was recovered.

This clearly indicates that methyl-lead bonds were present and consequently that methyl-lead compounds were formed in the presence of acetic acid.

EXAMPLE X

A flow experiment was performed which involved the reaction of deuterium chloride with aluminum carbide, followed by reaction of the products with light water.

Using the flow system of FIGURE 2 a total of 133 mmoles of deuterium chloride was passed over a 7.4 g.

(51.3 mmoles—excess of the amount required for stoichiometric reaction) sample of aluminum carbide heated to 300° C. Approximately equal amounts of deuterium chloride were used in 40 individual passes over the charge, each pass requiring about 30 minutes. Products of the reaction were isolated as previously described by allowing them to pass through U-traps cooled to −78° C. and −196° C. No attempt was made to collect and analyze non-condensible gases, which were continuously removed from the reaction system by pumping.

After the reaction had been completed the residual carbide charge was cooled and observed. That portion which the deuterium chloride first contacted had been reduced in amount and was grey in color while the remainder of the carbide retained its characteristic yellow color. White solids were deposited in the cold sections at either end of the heated carbide zone. On the pump side of the charge section at the juncture of the hot and cold zones were some brownish solids mixed with the white solids, which were presumably deposits of aluminum chloride.

The −196° C. U-trap contained only a small amount of gases (0.0935 mmole—not analyzed) which showed that the deuterium chloride had completely reacted. The −78° C. U-trap was removed from the system by sealing at the constrictions and attached through a hook-breaker arm to the vacuum line. Volatile material was pumped into a similar U-trap cooled to −196° C. for two hours, an operation which left non-volatile solids in the original U-trap. (This behavior was attributed to disproportionation of methyl aluminum species to aluminum chloride and methyl aluminum chlorides.) Both U-traps were isolated, and the contents of each were exposed to an excess of water at room temperature for several hours. The mass spectral analysis of the non-condensible gases (0.0891 mmole) from the U-trap (originally held at −78° C. during the flow reaction) which contained non-volatile solids is presented in Column VI of Table II below. The comparable analysis of the non-condensible gases (0.2589 mmole) which were isolated from the U-trap which contained the volatile material is listed in Column V. The analysis in Column V agrees well with that for a known sample of $CHD_3$ which shows that the material consisted of simple methyl aluminum chlorides. The analysis in sidual carbide did indicate the presence of small amounts of deuterated species. After correction for the $C^{13}$ isotope contribution and for water background, the analysis showed the sample was mostly methane with 1.8% $CH_3D$, 0.18% $CH_2D_2$ and 0.15% $CHD_3$.

About 0.01 g. of the brownish-white solids at the junction of the hot and cold zones were scraped into an ampoule and hydrolyzed in the above manner. The analysis of the non-condensible gases (0.009 mmole) is found in Column II and shows the following composition: $CHD_3$—36.8%, $CH_2D_2$—11.4%, $CH_4$—52.0%. The methane is derived from aluminum carbide which had been swept out of the charge section by the stream of methane.

A portion of the tube containing white solids which extended between the cold-hot junction and the −78° C. U-trap was placed in a round-bottom flask. Into the flask was distilled about one cc. of previously degassed water and the system was allowed to stand at room temperature for 12 hours. The flask was cooled to −196° C. and 0.0248 mmole of non-condensible gases were removed (mass spectrometric analysis in Column III of Table II). Another 12 hours at room temperature gave an additional 0.0202 mmole of non-condensible gas whose analysis is found in Column IV. In both cases, the gases consisted primarily of $CHD_3$ with smaller amounts of less deuterated species.

In the tables below, the peak heights are listed in terms of percentages, relative to the most intense mass.

*Table I*

MASS SPECTROMETRIC ANALYSES OF METHANE AND DEUTERATED METHANES—MERCK, SHARP & DOHME OF CANADA

[Relative intensity]

| M/e | $CH_4$ | $CH_3D$ | $CH_2D_2$ | $CHD_3$ | Fragments |
| --- | --- | --- | --- | --- | --- |
| 12 | 2.8 | 0.85 | 2.1 | 1.9 | $C^+$ |
| 13 | 9.9 | 3.68 | 3.2 | 1.3 | $CH^+$ |
| 14 | 21.5 | 8.11 | 6.8 | 6.7 | $CH_2^+, CD^+$ |
| 15 | 86.5 | 17.0 | 10.7 | 6.5 | $CH_3^+, CHD^+$ |
| 16 | 100 | 65.2 | 33.9 | 10.6 | $CH_2D^+, CD_2^+, CH_4^+$ |
| 17 |  | 100 | 60.5 | 48.4 | $CH_3D^+, CHD_2^+$ |
| 18 |  |  | 100 | 43.9 | $CH_2D_2^+$ |
| 19 |  |  |  | 100 | $CHD_3^+$ |

*Table II*

SUMMARY OF MASS SPECTROMETRIC ANALYSES ON NON-CONDENSIBLES RESULTING FROM HYDROLYSIS OF RESIDUES AND SAMPLES FROM DCl-Al$_4$C$_3$ FLOW EXPERIMENT

| M/e | Gray Portion of Residual Al$_4$C$_3$ Charge | Brown Solids from Pump Side of Furnace Section | White Solids in Tube From Pump Side of Furnace Section | Extra Time for Column III | Room Temperature Volatiles Collected at −78° C. | Non-volatiles at Room Temperature Collected at −78° C. |
| --- | --- | --- | --- | --- | --- | --- |
|  | I | II | III | IV | V | VI |
| 12 |  | 3.4 | 2.9 | 2.1 | 2.4 | 2.5 |
| 13 |  | 7.4 | 2.6 | 1.8 | 1.7 | 2.1 |
| 14 |  | 29.6 | 8.7 | 7.9 | 7.1 | 8.8 |
| 15 |  | 77.2 | 13.2 | 7.3 | 7.6 | 10.5 |
| 16 | 100 | 100 | 21.0 | 13.3 | 12.5 | 17.2 |
| 17 | 1.7 | 38.2 | 58.5 | 55.2 | 47.7 | 56.8 |
| 18 | 0.17 | 46.3 | 53.2 | 50.2 | 42.7 | 52.6 |
| 19 | 0.15 | 61.8 | 100 | 100 | 100 | 100 |
| 20 |  |  |  |  | 2.0 | 2.5 |
|  | $CH_4$<br>$CH_3D$—1.8%<br>$CH_2D_2$—0.18%<br>$CHD_3$—0.15% | $CHD_3$—36.8%<br>$CH_2D_2$—11.4%<br>$CH_3D$—0<br>$CH_4$—52.0% | $CHD_3$ plus some less deuterated species | | $CHD_3$ fits well | $CHD_3$ with some less deuterated species |

Column VI shows that species less deuterated than $CD_3H$ were evolved.

The remainder of the flow system was filled with dry nitrogen gas, broken at various spots with a hot glass rod, and the sections were transferred to the dry box. The residual carbide charge was divided into three sections, and portions of each were hydrolyzed at room temperature for 24 hours. No deuterated species were detected in the non-condensible gases arising from samples taken from the two yellow sections. However, the mass spectrometric analysis of the gases (0.578 mmole) resulting from the hydrolysis of 0.105 g. of the grey portion of the re-

We claim:

1. A method of making organometallic compounds of the formula $(CH_3)_nMX_{4-n}$ wherein M is an element of Group IVA having an atomic number of 14–82 inclusive, X is a halogen having an atomic number of 9–35 and $n$ is an integer having a value of 1–4, comprising reacting in an anhydrous, oxygen-free atmosphere, a metallic halide of the formula $MX_m$, wherein M and X are defined as aforesaid and $m$ is an integer equal to the valence of M, with aluminum carbide in the presence of an anhydrous acid selected from the group consisting of hydrofluoric, hydrobromic, hydrocholric and acetic acid, at a temperature of 70–450° C.

2. A method of making organosilicon compounds of the formula $(CH_3)_nSiX_{4-n}$ wherein X is a halogen having an atomic number of 9–35 and $n$ is an integer having a value of 1–4, comprising reacting in an anhydrous, oxygen-free atmosphere, a silicon halide of the formula $SiX_4$, wherein X is defined as aforesaid, with aluminum carbide in the presence of anhydrous hydrogen at a temperature of 70–450° C.

3. A method of making organogermanium compounds of the formula $(CH_3)_nGeX_{4-n}$ wherein X is a halogen having an atomic number of 9–35 and $n$ is an integer having a value of 1–4, comprising reacting in an anhydrous, oxygen-free atmosphere, a germanium halide of the formula $GeX_m$, wherein X is defined as aforesaid and $m$ is an integer having a value of 2 and 4, with aluminum carbide in the presence of an anhydrous hydrogen fluoride, at a temperature of 70–450° C.

4. A method of making methyltin compounds of the formula $(CH_3)_nSnX_{4-n}$ wherein X is a halogen having an atomic number of 9–35 and $n$ is an integer having a value of 1–4, comprising reacting in an anhydrous, oxygen-free atmosphere, a tin halide of the formula $SnX_m$, wherein X is defined as aforesaid and $m$ is an integer having a value of 2 and 4, with aluminum carbide in the presence of anhydrous hydrogen chloride at a temperature of 70–450° C. and removing said methyltin compounds as rapidly as they are formed.

5. A method of making methyllead compounds of the formula $(CH_3)_nPbX_{4-n}$ wherein X is a halogen having an atomic number of 9–35 and $n$ is an integer having a value of 1–4, comprising reacting in an anhydrous, oxygen-free atmosphere, a lead halide of the formula $PbX_m$, wherein M and X are defined as aforesaid and $m$ is an integer having a value of 2 and 4, with aluminum carbide in the presence of an anhydrous hydrogen chloride at a temperature of 70–450° C. and removing said methyllead compounds as rapidly as they are formed.

6. A method of making methylaluminum compounds of the formula $(CH_3)_nAlX_{3-n}$ wherein X is a halogen having an atomic number of 9–35 and $n$ is an integer having a value of 1–3, comprising reacting in an anhydrous, oxygen-free atmosphere, aluminum carbide with an anhydrous hydrogen halide of the formula HX wherein X is defined as aforesaid at a temperature of 150–450° C. and removing said methyl aluminum compounds as rapidly as they are formed.

7. A method of making methylaluminum compounds of the formula $(CH_3)_nAlCl_{3-n}$ wherein $n$ is an integer having a value of 1–3, comprising reacting in an anhydrous, oxygen-free atmosphere aluminum carbide with anhydrous hydrogen chloride at a temperature of 150–450° C. and removing said methylaluminum compounds as rapidly as they are formed.

No references cited.

HELEN M. McCARTHY, *Primary Examiner.*

J. G. LEVITT, *Assistant Examiner.*